US012288205B2

(12) United States Patent
Mossler et al.

(10) Patent No.: US 12,288,205 B2
(45) Date of Patent: *Apr. 29, 2025

(54) SYSTEMS AND METHODS FOR PROVIDING CARD INTERACTIONS

(71) Applicant: Capital One Services, LLC, McLean, VA (US)

(72) Inventors: Lara Mossler, Farmville, VA (US); Aravindhan Manivannan, Henrico, VA (US); Baskar Dilli, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/942,080

(22) Filed: Nov. 8, 2024

(65) Prior Publication Data

US 2025/0069069 A1 Feb. 27, 2025

Related U.S. Application Data

(60) Continuation of application No. 18/398,231, filed on Dec. 28, 2023, now Pat. No. 12,141,795, which is a
(Continued)

(51) Int. Cl.
*G06Q 20/38* (2012.01)
*G06F 21/31* (2013.01)
(Continued)

(52) U.S. Cl.
CPC ......... *G06Q 20/3821* (2013.01); *G06F 21/31* (2013.01); *G06Q 20/3263* (2020.05);
(Continued)

(58) Field of Classification Search
CPC ........... G06Q 20/3821; G06Q 20/3263; G06Q 20/352; G06Q 20/354; G06Q 20/3825;
(Continued)

(56) References Cited

U.S. PATENT DOCUMENTS 4,683,553 A 7/1987 Mollier
4,827,113 A 5/1989 Rikuna
(Continued)

FOREIGN PATENT DOCUMENTS

CA 3010336 A1 7/2017
CN 101192295 A 6/2008
(Continued)

OTHER PUBLICATIONS

"Verified by Visa Acquirer and Merchant Implementation Guide", May 2011, 114 pages (Year: 2011).*
(Continued)

*Primary Examiner* — James D Nigh
(74) *Attorney, Agent, or Firm* — TROUTMAN PEPPER LOCKE LLP; Christopher J. Forstner; John A. Morrissett

(57) ABSTRACT

A method including receiving a first application user credential associated with a user profile; comparing, for a first match, the first application user credential with a stored second application user credential, wherein the stored second application user credential is associated with a user identity; and responsive to finding a first match, verifying the user identity by performing the following: communicating with a card using near field communication; receiving a public key of a key pair of the card and cardholder identification information of an account holder of the card; instructing the card to generate a digital signature; receiving the digital signature from the card; verifying the digital signature using the public key; and comparing, for a second match, at least a portion of the user identity with at least a portion of the cardholder identification information.

22 Claims, 10 Drawing Sheets

Related U.S. Application Data continuation of application No. 17/559,218, filed on Dec. 22, 2021, now Pat. No. 11,861,600, which is a continuation of application No. 16/526,149, filed on Jul. 30, 2019, now Pat. No. 11,216,806, which is a division of application No. 16/135,954, filed on Sep. 19, 2018, now Pat. No. 10,395,244.

(51) Int. Cl.
*G06Q 20/32* (2012.01)
*G06Q 20/34* (2012.01)
*G06Q 20/40* (2012.01)
*H04L 9/32* (2006.01)

(52) U.S. Cl.
CPC ......... *G06Q 20/352* (2013.01); *G06Q 20/354* (2013.01); *G06Q 20/3825* (2013.01); *G06Q 20/3829* (2013.01); *G06Q 20/401* (2013.01); *G06Q 20/4014* (2013.01); *H04L 9/32* (2013.01)

(58) Field of Classification Search
CPC ............. G06Q 20/3829; G06Q 20/401; G06Q 20/4014; G06F 21/31; H04L 9/32
USPC ......................................................... 705/76
See application file for complete search history.

(56) References Cited

U.S. PATENT DOCUMENTS

| | | | |
|---|---|---|---|
| 4,910,773 | A | 3/1990 | Hazard et al. |
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,590,038 | A | 12/1996 | Pitroda |
| 5,592,553 | A | 1/1997 | Guski et al. |
| 5,616,901 | A | 4/1997 | Crandall |
| 5,666,415 | A | 9/1997 | Kaufman |
| 5,763,373 | A | 6/1998 | Robinson et al. |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,252,242 | B2 | 8/2007 | Ho |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,527,208 | B2 | 5/2009 | Hammad |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Kaminkow |
| 8,005,426 | B2 | 8/2011 | Huomo et al. |
| 8,010,405 | B1 | 8/2011 | Bortolin et al. |
| RE42,762 | E | 9/2011 | Shin et al. |
| 8,041,954 | B2 | 10/2011 | Plesman |
| 8,060,012 | B2 | 11/2011 | Sklovsky et al. |

(56) References Cited

U.S. PATENT DOCUMENTS

| | | |
|---|---|---|
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,870,081 B2 | 10/2014 | Olson |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,893 B2 | 5/2015 | Kirkham |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,199 B2 | 9/2015 | Spodak |
| 9,129,280 B2 | 9/2015 | Bona et al. |
| 9,152,832 B2 | 10/2015 | Royston et al. |
| 9,183,490 B2 | 11/2015 | Moreton |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,275,325 B2 | 3/2016 | Newcombe |
| 9,286,606 B2 | 3/2016 | Diamond |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,501,776 B2 | 11/2016 | Martin |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,692,879 B1 * | 6/2017 | Lack ................. H04L 63/08 |
| 9,710,744 B2 | 7/2017 | Wurmfeld |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,949,065 B1 | 4/2018 | Zarakas |
| 9,953,323 B2 | 4/2018 | Candelore et al. |
| 9,961,194 B1 | 5/2018 | Wiechman et al. |
| 9,965,632 B2 | 5/2018 | Zarakas |
| 9,965,756 B2 | 5/2018 | Davis et al. |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld et al. |
| 9,990,795 B2 | 6/2018 | Wurmfeld |
| 10,007,873 B2 | 6/2018 | Heo |
| 10,013,693 B2 | 7/2018 | Wyatt |
| 10,043,164 B2 | 8/2018 | Dogin et al. |
| 10,055,715 B1 * | 8/2018 | Grassadonia ......... G06Q 20/36 |
| 10,075,437 B1 | 9/2018 | Costigan et al. |
| 10,121,130 B1 | 11/2018 | Pinski |
| 10,129,648 B1 | 11/2018 | Hernandez et al. |
| 10,133,979 B1 | 11/2018 | Eidam et al. |
| 10,165,440 B2 * | 12/2018 | Smith ................. H04L 9/3271 |
| 10,210,505 B2 | 2/2019 | Zarakas |
| 10,217,105 B1 | 2/2019 | Sangi et al. |
| 10,242,368 B1 | 3/2019 | Poole |
| 10,296,910 B1 | 5/2019 | Templeton |

(56) References Cited

U.S. PATENT DOCUMENTS

| | | |
|---|---|---|
| 10,332,102 B2 | 6/2019 | Zarakas |
| 10,360,557 B2 | 7/2019 | Locke |
| 10,380,471 B2 | 8/2019 | Locke |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,685,349 B2 | 6/2020 | Brickell |
| 10,880,741 B2 | 12/2020 | Zarakas |
| 10,970,691 B2 | 4/2021 | Koeppel |
| 11,138,593 B1 | 10/2021 | Ho |
| 11,138,605 B2 | 10/2021 | Aabye |
| 11,188,908 B2 | 11/2021 | Locke |
| 11,334,872 B2 | 5/2022 | Phillips |
| 11,481,764 B2 | 10/2022 | Shakkarwar |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0126260 A1* | 5/2008 | Cox ............. G06Q 20/3552 705/67 |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0191811 A1* | 7/2009 | Griffin ............. H04L 67/04 455/41.1 |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0011063 A1* | 1/2012 | Killian ............. G06Q 20/349 705/41 |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |

(56) References Cited

U.S. PATENT DOCUMENTS

| | | |
|---|---|---|
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0297933 A1* | 11/2013 | Fiducia ............... H04L 63/0823 713/156 |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0186887 A1 | 7/2015 | Khan et al. |
| 2015/0199673 A1 | 7/2015 | Savolainen |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0350171 A1* | 12/2015 | Brumley ............. H04L 63/0876 713/176 |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0261411 A1* | 9/2016 | Yau .................. G06Q 20/38215 |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0307190 A1* | 10/2016 | Zarakas ............... G06Q 20/321 |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |

(56) References Cited

U.S. PATENT DOCUMENTS

| | | |
|---|---|---|
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0032994 A1 | 2/2018 | Myers et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0158042 A1* | 6/2018 | Finch ............... G06Q 20/204 |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1469419 A1 | 10/2004 |
| EP | 1783919 A1 | 5/2007 |
| EP | 2139196 A1 | 12/2009 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| KR | 2015140132 A | 12/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | WO-2010032215 A1 * | 3/2010 ............ G06Q 20/20 |
| WO | 2010049252 A1 | 5/2010 |
| WO | 2011089423 A2 | 7/2011 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017047855 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2019022585 A1 | 1/2019 |

OTHER PUBLICATIONS

EMVCo White Paper on Contactless Mobile Payment, Version 2.2, Jun. 2015, 33 pages (Year: 2015).*

EMV Issuer and Application Security Guidelines, Version 2.6, Aug. 2018, 78 pages (Year: 2018).* https://monzo.com/blog/2017/11/14/nfc-card-activation/; (Year: 2017).

Extended European Search Report in related EP Application No. 19198300.6, mailed Feb. 25, 2020.

Anonymous: "Issuer and Application Security Guidelines," Aug. 31, 2018, https://www.emvco.com/terms-of-use/?u=wp-content/uploads/documents/EMV-swg-nh20r2a-Issuer-Security-Guidelines-for-1st-Gen-August2018.pdf.

Anonymous: "Tap to Activate Your Debit Card," Nov. 14, 2017, https://monzo.com/blog/2017/11/14/nfc-card-activation.

Partial European Search Report in related EP Application No. 19198300.6, mailed Nov. 27, 2019.

Office Action in related European Patent Application No. 19198300.6 Jul. 5, 2024.

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved

(56) References Cited

OTHER PUBLICATIONS from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared-or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
Smart Card Alliance, "Co-Branded Multi-Application Contactless Cards for Transit and Financial Payment," A Smart Card Alliance Transportation Council White Paper (40 pages), Mar. 2008.

* cited by examiner

SYSTEMS AND METHODS FOR PROVIDING CARD INTERACTIONS

CROSS REFERENCE TO RELATED APPLICATIONS

This application is a continuation of, and claims priority under 35 U.S.C. § 120 to, U.S. patent application Ser. No. 18/398,231, filed Dec. 28, 2023, which is a continuation of U.S. patent application Ser. No. 17/559,218, now U.S. Pat. No. 11,861,600, filed Dec. 22, 2021, which is a continuation of U.S. patent application Ser. No. 16/526,149, now U.S. Pat. No. 11,216,806, filed Jul. 30, 2019, which is a divisional of U.S. patent application Ser. No. 16/135,954, now U.S. Pat. No. 10,395,244, filed Sep. 19, 2018, the entire contents and substance of each of which are hereby incorporated by reference in their entireties.

FIELD

The presently disclosed subject matter relates generally to systems methods for providing interactions between a contactless device and a user device, and, more particularly, to systems and methods for authenticating a user and/or providing other account functions to a cardholder based on an authenticated communication between a contactless transaction card and a user device of the cardholder.

BACKGROUND

Activating many cards, and more specifically financial cards (e.g., credit cards), involve the time-consuming process of cardholders calling a telephone number or visiting a website and entering or otherwise providing card information. Further, while the growing use of chip-based financial cards provides more secure features over the previous technology (e.g., magnetic strip cards) for in-person purchases, account access still typically relies on log-in credentials (e.g., username and password) to confirm a cardholder's identity. However, if the log-in credentials are compromised, another person could have access to the user's account.

Accordingly, there is a need for both an improved method of activating a card and an improved authentication for account access.

SUMMARY

Aspects of the disclosed technology include systems and methods for providing authenticated cardholder access. Consistent with the disclosed embodiments, the systems and methods may utilize one or more computing devices, processors, web servers, account servers, and/or contactless devices (e.g., radio frequency identification (RFID) cards). A method may include an application executing on a computing device receiving a first application user credential associated with a user profile. A processor associated with the application compares the first application user credential with a stored second application user credential. The stored second application user credential is associated with a user identity (e.g., a user account or user profile). In response to finding a match, the user may be authenticated to access the application. In some embodiments, the user identity may be further verified (e.g., second or multi-factor authentication) via an authentication communication protocol between the computing device and a contactless device.

For example, in some embodiments, the authentication communication protocol may be established as part of a wireless communication between a transaction card (e.g., a credit card associated with the user) through the use of near field communication (NFC) with the computing device (e.g., a smartphone). The authentication communication protocol may include receiving a digital signature from the transaction card, verifying the digital signature, and comparing at least a portion of card information to user account information (e.g., comparing the user identity with at least a portion of cardholder identification information). In some embodiments, the authentication communication protocol may conform to an offline dynamic data authentication protocol or an offline combined data authentication protocol as part of an EMV standard. In some embodiments, the authentication communication protocol between the contactless device and a user computing device may include one or more steps that mimic an authentication protocol between a contactless transaction card and a point-of-sale device, except in the disclosed embodiments, the authentication protocol is not used to complete a payment transaction and does not require real-time online connectivity to an issuer of the transaction card. Furthermore, the example authentication communication protocol disclosed herein may be used as a form of authentication for a user associated with the computing device (as opposed to a point of sale device) as detailed herein. And because the example authentication communication protocol uses two NFC capabilities (e.g., READ and WRITE), the example techniques use dynamic data and public and private keys to validate the signatures and certificates of the card issuer, the card, the user, and the interaction between the transaction card and a user's computing device, as detailed below. The example embodiments are thus advantageous over other NFC techniques that use only READ capability to perform static data check methods, such as to obtain a primary account number (PAN) of a transaction card, and thus lack the security available via offline dynamic data authentication. Thus, the example embodiments uniquely take advantage of the strong security of offline dynamic data authentication techniques to establish an authentication communication protocol between a transaction card and a user's computing device to achieve a trusted form of authentication that may be used to activate a card, as a form of multifactor authentication, and/or to unlock other functionality of a mobile application.

A contactless device (e.g., card, tag, transaction card or the like) may use near field communications technology for bi-directional or uni-directional contactless short-range communications based on, for example, radio frequency identification (RFID) standards, an EMV standard, or using NFC Data Exchange Format (NDEF) tags. The communication may use magnetic field induction to enable communication between electronic devices, including mobile wireless communications devices. Short-range high frequency wireless communications technology enables the exchange of data between devices over a short distance, such as only a few centimeters.

In the present disclosure, authentication or verification of a contactless device based on the completion of an example authentication communication protocol between a contactless device and a user computing device may be a primary form of authentication or a secondary form of authentication. Furthermore, completion of an example authentication communication protocol between the contactless device and a user computing device may enable other functionality. For example, in some embodiments, a cardholder can activate a contactless card based on the example authentication communication protocol by tapping it against a user computing device (e.g., a mobile device) implementing a card reader.

For example, the device may include a card reader antenna (e.g., an NFC antenna) which may send and receive information with a contactless card, and an application executing on the device may be configured to implement card reading capabilities with the card reader. Through NFC, a communication link is established between the contactless card and the application. After establishing the communication link, the card transmits cardholder data including a digital signature to the application. Based on the digital signature (e.g. upon authentication of the card), the application recognizes the card as belonging to a specific account server (e.g., associated with a specific customer account). The application communicates data associated with the card to the specific account server and requests activation of the card. The account server activates the card within its system and transmits an indication of the success of the activation to the application. The application then displays the status of the card activation to the user.

The contactless card may also be linked to user credentials to provide greater account access. A user may enter user credentials to log onto the application. The application verifies the user credentials by comparing, for at least a portion of a match, the user credentials to stored user credentials. Once verified, the user may access certain first-level user account options. For greater access and/or executing certain account functions, i.e., second-level user account options, second-factor authentication may be required. For example, the contactless card may be tapped against the user device while card-reading is enabled. The application may communicate with the card (e.g., through NFC). The application may receive cardholder data and/or a digital signature from the card, and the application compares the cardholder data to a user identity associated with the user. If the cardholder data corresponds to the user identity, the user may access second-level user account options.

In an example scenario, to log a user into an application, an application associated with a computing device (e.g., smartphone) receives a user's credentials. The user credentials could be, for example, biometrics data (e.g., fingerprint data, optical data, and/or facial recognition), an established gesture associated with the user, and/or a username and password combination. A processor associated with the application performs a check of the provided application user credentials against a stored application user credential. The first match allows the user access to first-level user account options (e.g., display of account balance, display of recent transactions). A second level of authentication may be required to access second-level user account options. The second level of authentication may involve the application communicating with a transaction card by using a card reader associated with the computing device. From the transaction card, the application receives cardholder identification information of an account holder of the transaction card. Using a certificate authority public key, the application extracts an issuer public key from the transaction card. The application uses the issuer public key to extract the card public key of a key pair. The application then instructs the transaction card to generate a digital signature by using a private key of the key pair of the transaction card. Using the card public key, the application verifies the digital signature. To perform second-factor authentication, the processor compares, for a second match, at least a portion of the user identity with at least a portion of the cardholder identification information. For example, the processor may compare the user's name from the user identity with the user's name associated with the cardholder identification information. Upon authentication, the application grants the user access to several second-level user account options including a payment transfer, a payment request, a personal identification number (PIN) change request, and an address change request.

Further features of the disclosed design, and the advantages offered thereby, are explained in greater detail hereinafter with reference to specific example embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. The disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
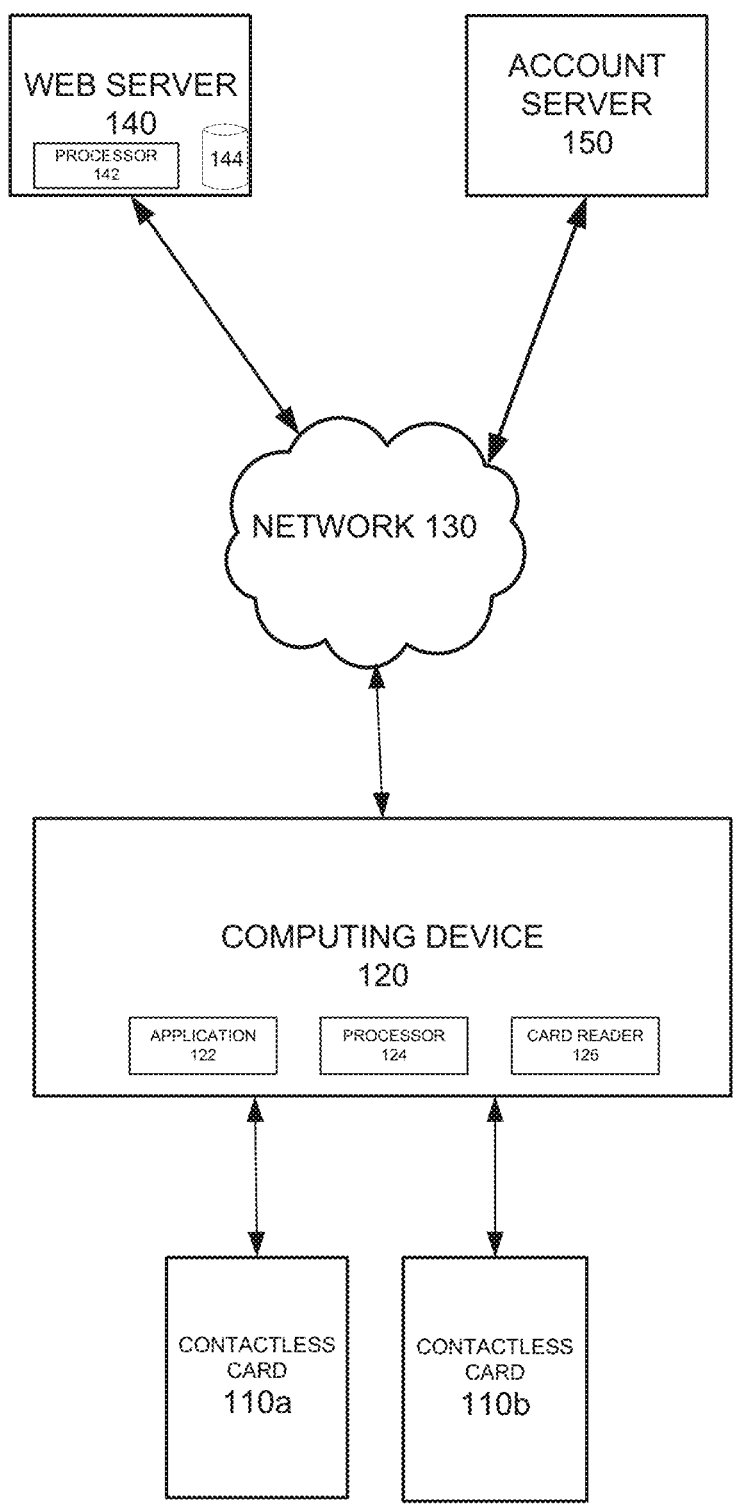
FIG. 1 is a diagram of an example environment that may be used to implement one or more embodiments of the present disclosure.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 includes one or more contactless cards 110a and 110b, one or more computing devices 120 which include one or more applications 122 and one or more processors 124, a network 130, a web server 140 which may include a processor 142 and a database 144, and an account server 150 (e.g., a server of a card issuer or card manager). As non-limiting examples, the computing device 120 may be a personal computer, a smartphone, a laptop computer, a tablet, or other personal computing device. The network 130 may include a network of interconnected computing devices more commonly referred to as the internet. The web server 140 may include one or more physical or logical devices (e.g., servers). The computing device 120 may run and display one or more applications and the related output(s) of the one or more applications (e.g, through APIs) 122. The computing device 120 may include a card reader 126 or one or more components that may function to read from and/or communicate with a contactless card (e.g., a digital card reader). In conjunction with the one or more applications 122, the card reader 126 communicates with the one or more contactless cards 110a and 110b (e.g., RFID cards). An example computer architecture that may be used to implement one or more of the computing device 120, the account server 150 and the web server 140 is described below with reference to FIG. 8.

In certain implementations according to the present disclosure, the contactless card 110a and/or 110b includes a radio frequency identification chip enabled to communicate via near field communication (NFC) or other short-range communication protocols. In other embodiments, the contactless card 110a may communicate through other means including, but not limited to, Bluetooth, satellite, and/or WiFi. According to some embodiments, the contactless card 110a communicates with the card reader 126 through near field communication when the contactless card 110a is within range of the card reader 126. The contactless card 110a may send to the application 122 a certificate authority public key and cardholder identification information of an account holder. The cardholder identification information may include a personal identification number (PIN), a name of the user, an address, a date of birth, and/or the like. In response to instructions from the application 122, the contactless card 110a may extract the issuer public key from the contactless card 110a. The application 122 uses the issuer public key to extract the card public key of a key pair from the contactless card 110a. The application 122 may instruct the contactless card 110a to generate a digital signature using the card private key of the key pair. In some embodiments, the contactless card 110a may send the digital signature to the computing device 120.

Turning to the computing device 120, in some embodiments, the computing device 120 includes an application 122 and a processor 124. According to some embodiments, the application 122 receives, from a user, a first application user credential associated with a user profile. The first application user credential may include biometrics data, an established gesture associated with user recognition, a username and password combination, and/or the like. The processor 124 compares the first application user credential with a stored second application user credential. The stored second application user credential may be associated with the user identity. In some embodiments, the stored second application user credential is maintained on a web server 140 and the first match is performed by the web server 140. In some embodiments, upon determining a first match between the first application user credential and the stored second application user credential, the application 122 may grant the user access to one or more first-level user account options of a user account. The user account may be a financial account, a health insurance account, and/or any other account of the like associated with any service provider (e.g., a transit account, an entertainment account, etc.). The first-level user account options of a user account may include a display of an account balance, a display of recent transactions, and/or the like.

After determining the first match, in response to one or more actions associated with the application or an account, the computing device 120 may further verify the user identity by communicating with the contactless card 110a, and verifying the contactless card 110a corresponds to the user account. The application 122 may communicate with the contactless card 110a using short-range wireless communication (e.g., near field communication (NFC)). The application 122 may be configured to interface with a card reader 126 of computing device 120 capable of communicating with a contactless card. As should be noted, those skilled in the art would understand that a distance of less than twenty centimeters is consistent with NFC range.

In some embodiments, the application 122 communicates through an associated reader (e.g., card reader 126) with the contactless card 110a. The application 122 may receive, from the contactless card 110a, a public key of a key pair of the card and cardholder identification information of an account holder of the card. The cardholder identification information may include a personal identification number (PIN), a name of the user, an address, a date of birth, and/or the like. In response to instructions from the application 122, the contactless card 110a may extract the issuer public key from the contactless card 110a. The application 122 uses the issuer public key to extract the card public key of a key pair from the contactless card 110a. The application 122 may instruct the contactless card 110a to generate a digital signature using a private key of the key pair of the contactless card 110a. The computing device 120 verifies the digital signature using the card public key. The processor 124 compares at least a portion of the user identity with at least a portion of the cardholder identification information. In some embodiments, upon determining a second match between the user identity (e.g., the identity previously authenticated by application 122) and the cardholder identification information obtained from the contactless card, the application 122 grants the user access to one or more second-level user account options of a user account. According to some embodiments, the second-level user account options have a higher security requirement than the first-level user account options. As non-limiting examples, the second-level user account options of a user account may include a payment transfer, a payment request, a personal identification number (PIN) change request, an address change request, a card activation, and/or the like.

In some embodiments, card activation may occur without first-level user authentication. For example, a contactless card 110a may communicate with the application 122 through the card reader 126 of the computing device through NFC. The communication (e.g., a tap of the card proximate the card reader 126 of the computing device 120) allows the application 122 to read the data associated with the card and perform an activation. In some cases, the tap may activate or launch application 122 and then initiate one or more actions or communications with an account server (e.g., 150) to activate the card for subsequent use. In some cases, if the application 122 is not installed on computing device 120, a tap of the card against the card reader 126 may initiate a download of the application 122 (e.g., navigation to an application download page). Subsequent to installation, a tap of the card may activate or launch the application 122, and then initiate (e.g., via the application or other back-end communication) activation of the card. After activation, the card may be used in various transactions including commercial transactions.

According to some embodiments, the contactless card 110*a* is a virtual payment card. In those embodiments, the application 122 may retrieve information associated with the contactless card 110*a* by accessing a digital wallet implemented on the computing device 120, wherein the digital wallet includes the virtual payment card.

Figure 2:
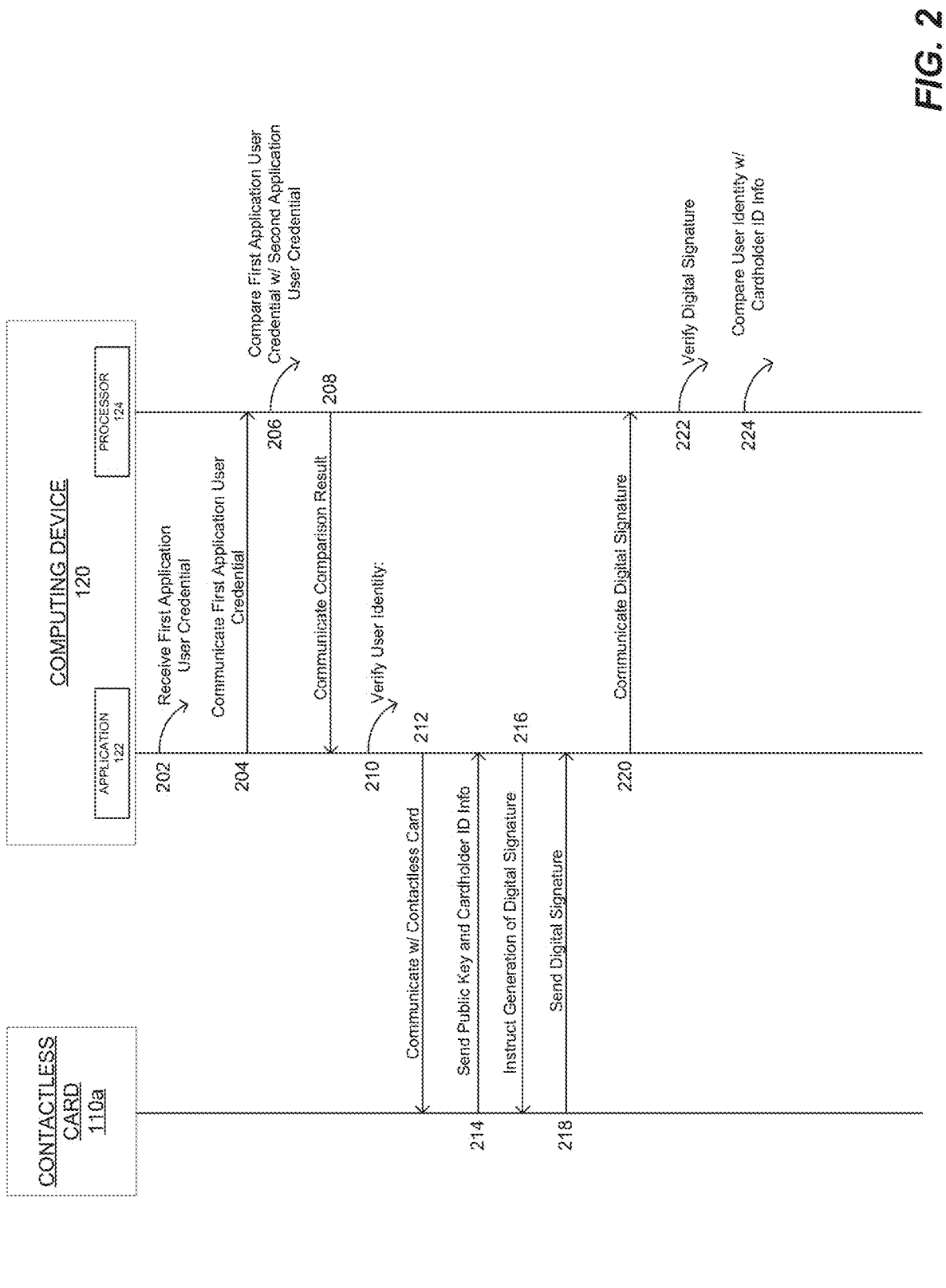
FIG. 2 is a timing diagram providing authenticated cardholder access according to an example embodiment.

FIG. 2 is a timing diagram illustrating an example sequence for providing authenticated cardholder access according to an example embodiment. According to some embodiments, at 202 the application 122 receives the first application user credentials. A user may provide the first application user credentials after receiving a prompt from the application 122. The first application user credentials may include biometrics data, an established gesture associated with user recognition, a username and password combination, facial recognition, and/or the like. At 204, the application 122 communicates the first application user credentials to the processor 124. The processor 124 compares the first application user credentials with stored second application user credential, at 206. The stored second application user credential may be located within a database associated with the computing device 120 or with application 120. In some embodiments, the stored second application user credential is maintained on a server (e.g., account server 150), the first application user credential is provided to the server, and the server compares the first application user credential to the stored second application user credential.

At 208, the processor 124 communicates the comparison result to the application 122 (e.g., for a match). In some embodiments, a first match grants the user access to first-level user account options of a user account (e.g., display of an account balance and/or recent transactions). Responsive to finding a first match, at 210, the application 122 initiates verifying the user identity. For example, the application 122 may output for display on the computing device 120 a notification to bring a contactless card 110*a* near the computing device 120. At 212, the application 122 communicates with the contactless card 110*a* (e.g., after being brought near the contactless card 110*a*). Communication between the application 122 and the contactless card 110*a* may involve the contactless card 110*a* being sufficiently close to the card reader 126 of the computing device to enable NFC data transfer between the application 122 and the contactless card 110*a*. At 214, the contactless card 110*a* sends, to the application 122, a public key of a public/private key pair and cardholder identification information of an account holder of the card. The application 122, at 216, instructs the contactless card 110*a* to generate a digital signature using a private key of the key pair of the card. In some cases, the cardholder identification information may be incorporated within the digital signature or otherwise conveyed with the digital signature.

At 218, the contactless card 110*a* sends the digital signature to the application 122. At 220, the application 122 communicates the digital signature with the processor 124. The processor 124, at 222, verifies the digital signature using the public key. For example, the card may provide a hash of the card's public key encrypted by a trusted source (e.g., a private key of a card provider), and verifying the digital signature may include: decrypting the encrypted hash (e.g., with a public key of the card provider); calculating a new hash of the digital signature; and comparing the decrypted original hash to the new hash for a match, at which point the card provider (e.g., issuer), and the transaction card may be authenticated. By using this READ and WRITE NFC capability to perform offline dynamic data authentication between a contactless card and a user's computing device, the example embodiments provide unique advantages that enable application 122 to more reliably (e.g., with greater security from counterfeiting or card skimming, or man in the middle attacks) authenticate a contactless card to be used as a form of multifactor authentication. As disclosed below in FIG. 10, communication between the application 122 and the contactless card 110*a* may include additional interactions. At 224, the processor 124 compares at least a portion of the user identity with at least a portion of the cardholder identification information. In some embodiments, a second match grants the user access to second-level user account options of a user account (e.g., a payment request, a payment transfer, a card activation, a personal identification number (PIN) change request, and an address change request). According to some embodiments, the second-level user account options represent more secured features of the application 122.

In some cases, verifying the digital signature may be performed by a server connected to the computing device. For example, processor 124 may output the digital signature for transmission to account server 150, and account server 150 may verify the digital signature.

Figure 3:
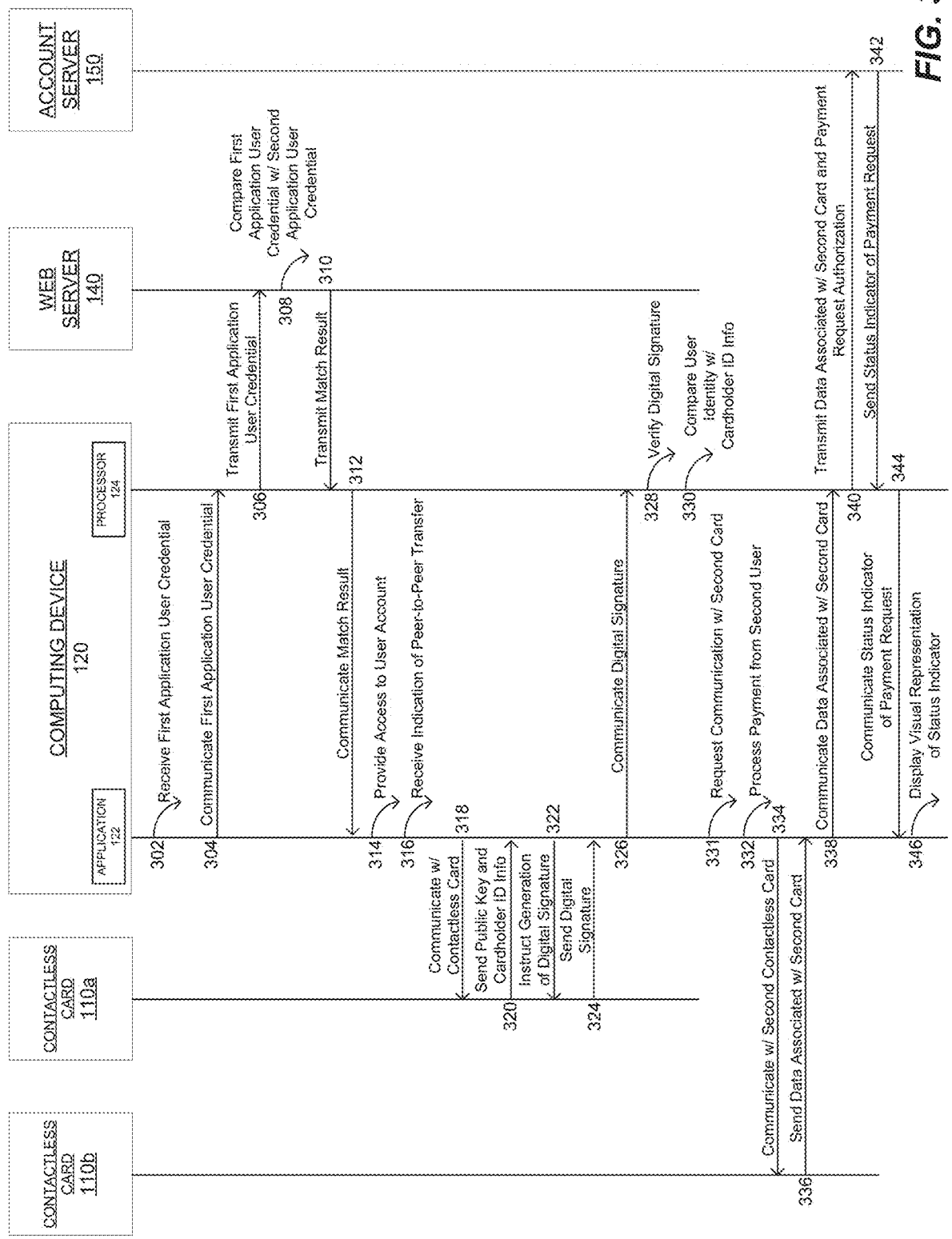
FIG. 3 is a timing diagram of peer-to-peer transfer according to an example embodiment.

FIG. 3 is a timing diagram of peer-to-peer transfer according to an example embodiment. In some embodiments, the application 122 may prompt a user for first application user credentials. At 302, the application 122 receives the first application user credentials. The first application user credentials may include biometrics data, an established gesture associated with user recognition, a username and password combination, facial recognition, and/or the like. The application 122 communicates the first application user credentials to the processor 124, at 304. At 306, the processor 124 transmits the first application user credentials to the web server 140. The web server 140, at 308, compares the first application user credentials to a second stored application user credential stored located on the web server 140 (e.g., to see if they match). At 310, the web server 140 transmits the match result to the processor 124. The processor 124, at 312, communicates the match result to the application 122. At 314, in response to a match being found, the application 122 provides access to the user account.

At 316, the application 122 receives an indication requesting a peer-to-peer transfer (e.g., an indication of a payor or a payee from the user account). For example, the user may select a request payment option. The peer-to-peer transfer may require authentication, such as requesting cardholder identification data for comparison to the user identity. At 318, the application 122 communicates with the contactless card 110*a*. Communication between the application 122 and the contactless card 110*a* may involve the contactless card 110*a* being sufficiently close to the card reader 126 of the computing device to enable NFC between the application 122 and the contactless card 110*a*. The contactless card 110*a* sends the public key of a public/private key pair and cardholder identification information to the application 122 at 320. At 322, the application 122 instructs the contactless card 110a to generate a digital signature using a private key of the key pair of the card. In some cases, the digital signature may include the cardholder identification information.

At 324, the contactless card 110a sends the digital signature to the application 122. At 326, the application 122 communicates the digital signature to the processor 124. The processor 124 verifies the digital signature at 328. At 330, the processor 124 compares (e.g., for a match), at least a portion of the user identity with at least a portion of the cardholder identification information. If the digital signature and cardholder identification are verified, at 331 the application 122 may request communication with a second transaction card from a second user.

In some embodiments the method may further include, at 332, processing the second transaction card (e.g., the other one of payor or payee) from the second user. At 332, the application processes the payment from the second user and requested by the first user. Processing the payment may involve communicating with the second contactless card 110b at 334. As mentioned above, communication between the application 122 and the second contactless card 110b may include the application 122 having access to card reader 126 (e.g., a digital reader) of the computing device 120, and the second contactless card 110b having an RFID chip. The contactless card 110b may be sufficiently close to the card reader 126 to enable near field communication therebetween. At 336, the second contactless card 110b sends data associated with the card to the application 122. The application 122 communicates the data associated with the second contactless card 110b to the processor 124 at 338. At 340, the processor 124 transmits the data associated with the second contactless card 110b and a payment authorization request to the account server 150. The account server 150 processes the payment request by either approving or denying the payment.

At 342, the account server 150 sends a status indicator of the payment request to the processor 124. The status indicator of the payment request may include an approved status indicator or a declined status indicator. At 344, the processor 124 communicates the status indicator of the payment request to the application 122. At 346, the application 122 displays a visual representation of the status indicator on the computing device 120.

Figure 4:
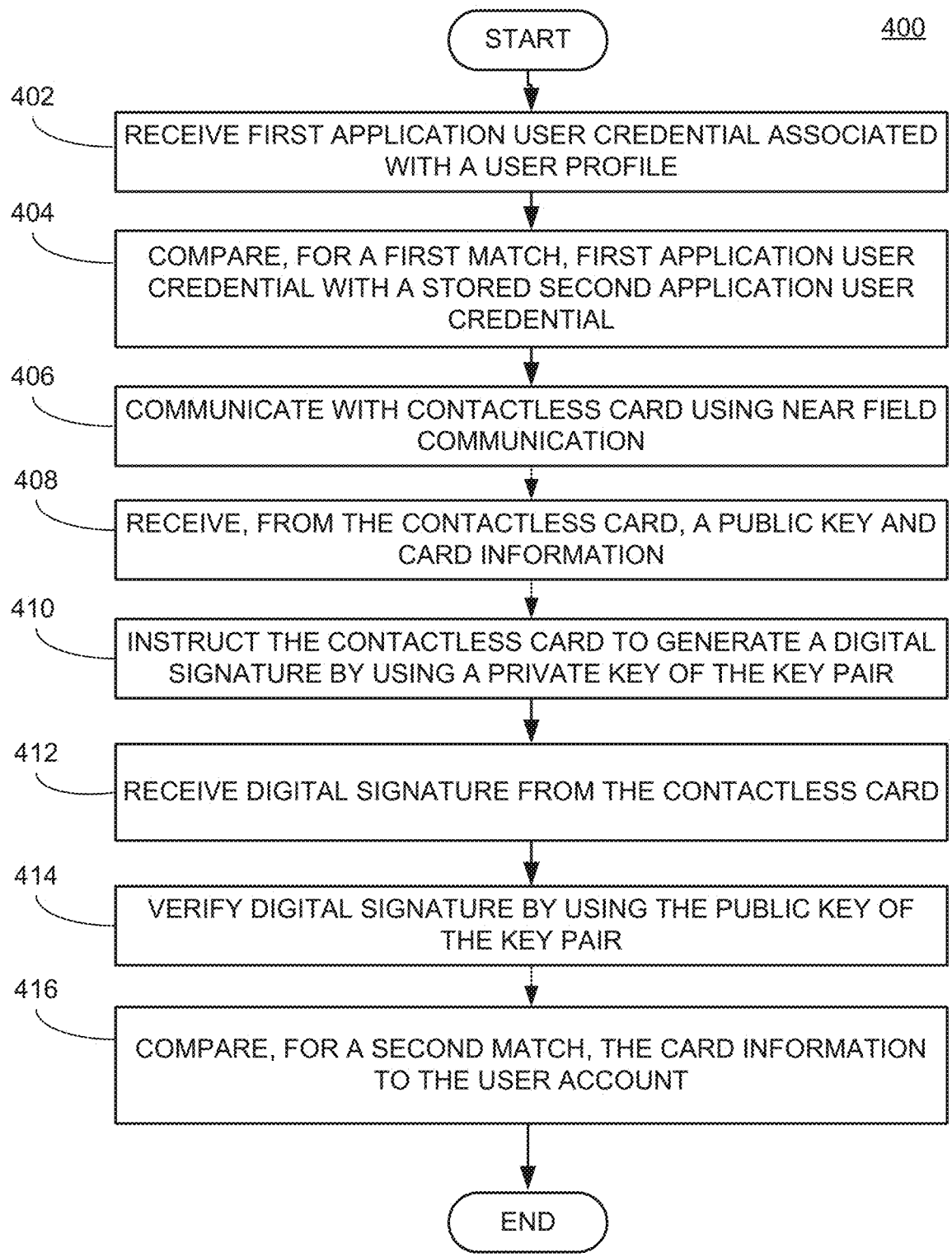
FIG. 4 is a flow chart of a method providing authenticated cardholder access according to an example embodiment.

FIG. 4 is a flow chart of a method providing authenticated cardholder access according to an example embodiment. At 402, the application 122 receives, from a user, a first application user credential associated with a user profile. As mentioned above, a user may provide the first application user credentials after receiving a prompt from the application 122. In some embodiments, the first application user credential may include biometrics data, an established gesture associated with user recognition, a username and password combination, and/or the like. At 404, the processor 124 compares the first application user credential with a stored second application user credential. The stored second application user credential may be associated with a user identity. The user identity may include a personal identification number (PIN), a name of the user, an address, a date of birth, and/or the like.

According to some embodiments, after finding a first match, the application 122 grants access to first-level user account options including a display of an account, a display of recent transactions, and/or the like. In response to finding a match, the computing device 120 verifies the user identity.

At 406, the application 122 communicates with the contactless card 110a, for example, via an RFID chip in the contactless card 110a. The application 122 is associated with a card reader 126 allowing near field communication between the contactless card 110a and the application 122. At 408, the application 122 receives a public key of a public/private key pair of the card from the contactless card 110a. At 408, the application may also receive card information of the contactless card 110a. The card information may include cardholder information such as a personal identification number (PIN), a name of the user, an address, a date of birth, and/or the like. At 410, the application 122 instructs the contactless card 110a to generate a digital signature by using a private key of the key pair of the card. The contactless card 110a generates the digital signature, and the application 122 receives the digital signature from the contactless card 110a at 412. At 414, the computing device 120 verifies the digital signature by using the public key of the key pair of the card.

At 416, the processor 124 compares the card information to the user account. For example, processor 124 may compare the user identity to cardholder identification information. In some embodiments after verifying using the contactless card 110a, the application 122 grants access to second-level user account options including, as non-limiting examples, a payment request, a payment transfer, a card activation, a personal identification number (PIN) change request, an address change request, and/or the like. The second-level user account options may have a higher security requirement than the first-level user account options.

Figure 5:
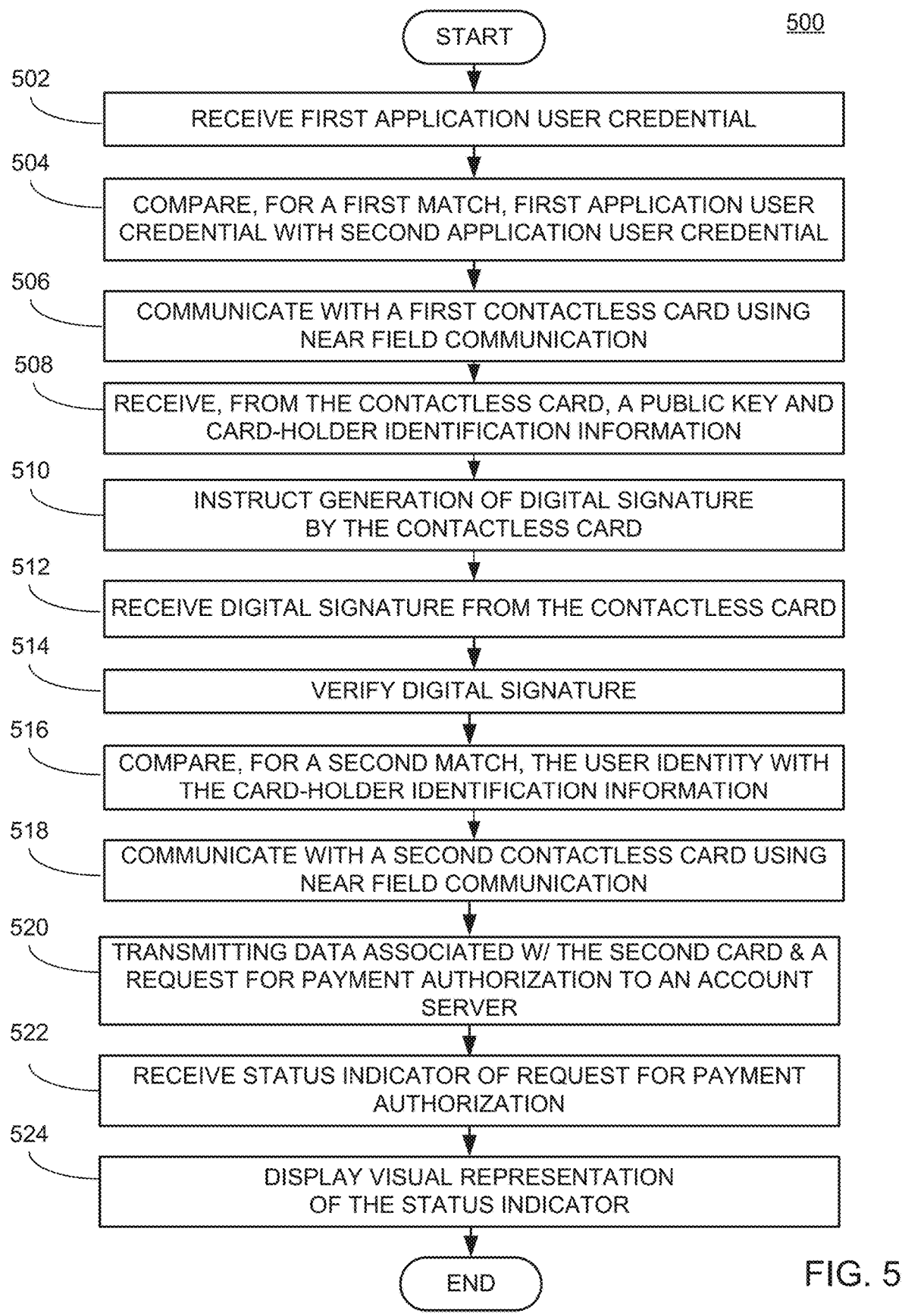
FIG. 5 is a flow chart of a method providing authenticated cardholder access according to an example embodiment.

FIG. 5 is a flow chart of a method providing peer-to-peer payments according to an example embodiment. Referring to FIG. 5, the method includes: receiving, by the application 122, a first application user credential at 502 from a user; and comparing, for a match, the first application user credential with a stored second application user credential at 504. These features may be substantially similar to the corresponding features described above with reference to FIG. 4.

In response to receiving a request for a peer-to-peer payment (e.g., an in-person exchange of funds), the method may further include: communicating with a first contactless card 110a using near field communication at 506; receiving, from the contactless card 110a, a public key of a key pair and card information at 508; instructing the contactless card 110a to generate a digital signature at 510; receiving the digital signature from the contactless card 110a at 512; verifying the digital signature at 514; and comparing, for a second match, at least a portion of the user identity with at least a portion of the cardholder identification information at 516. These features may be substantially similar to the corresponding features described above with reference to FIG. 4.

Once the first contactless card 110a is verified, a prompt may be displayed requesting communication with the second contactless card 110b (e.g., a card tap). At 518, the application 122 communicates with the second contactless card 110b using near field communication. Communication may involve receiving data from the second contactless card 110b. For example, computing device 120 may receive a digital signature, a public key and/or card information from the second contactless card 110b similar to that discussed with reference to the first contactless card 110a. At 520, the processor 124 may transmit data associated with the second contactless card 110b and a request for payment authorization to the account server 150. The account server processes the request for payment and/or receipt either approves or declines the payment. At 522, the computing device 120 receives, from the account server 150, a status indicator of the request for payment authorization. The status request indicator may be an approved status indicator or a declined status indicator. At 524, the application 122 displays a visual representation of the status indicator on the computing device 120.

Figure 6:
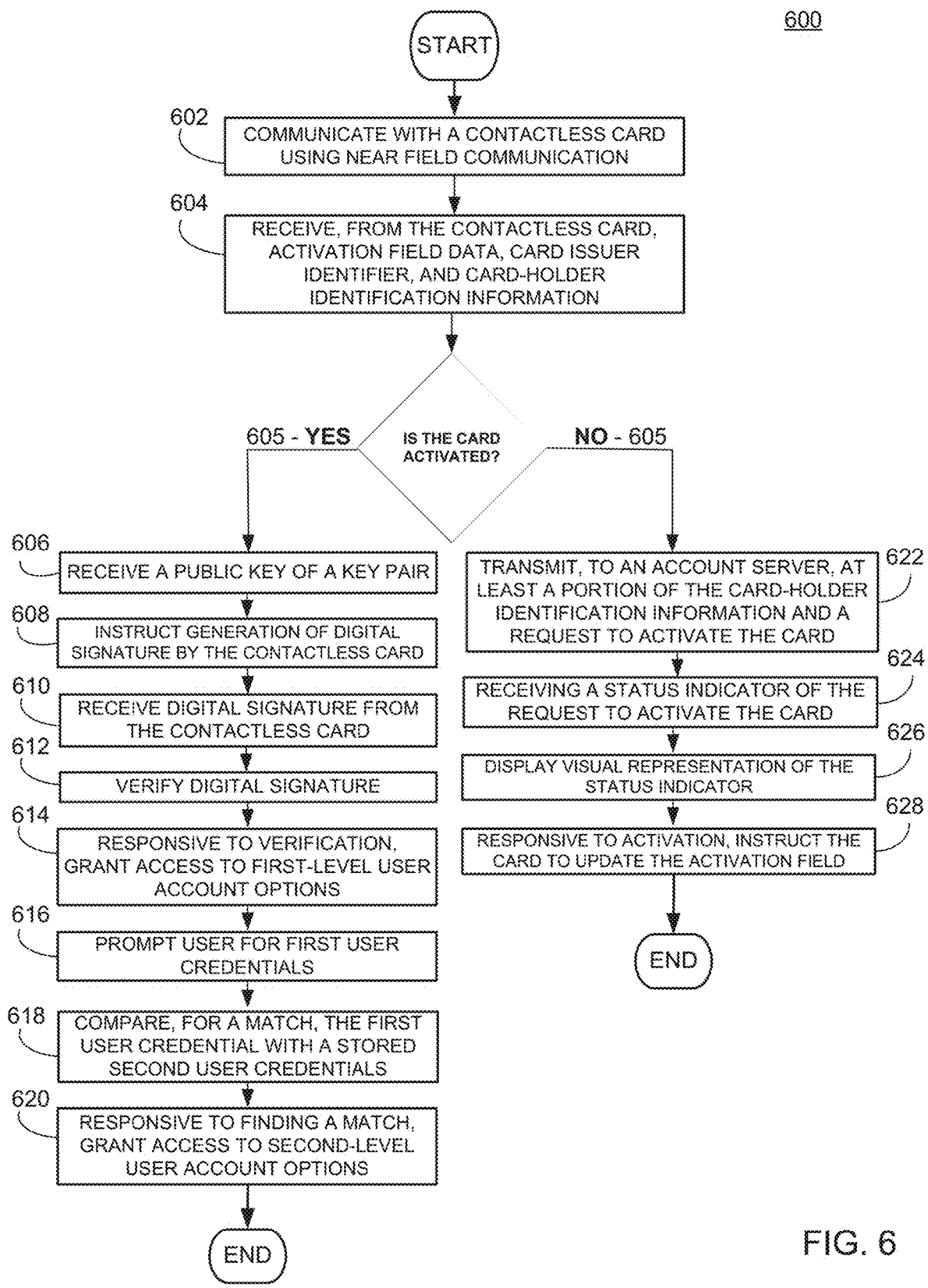
FIG. 6 is a flow chart of a method providing activation of a card according to an example embodiment.

FIG. 6 is a flow chart of a method for communicating with a contactless card according to an example embodiment. The method 600 may be executed, for example, by computing device 120, for example, implementing a card reader 126 (e.g., a reader application and a short-range antenna). At 602, the application communicates with the contactless card 110a through near field communications. At 604, the communications may involve the application 122 receiving, from the contactless card 110a, card information including one or more of an activation field, the card issuer identifier, and card-holder identification information. In some cases, application 122 may request specific data from contactless card 110a. The activation field indicates whether the contactless card 110a is active (e.g., whether the card is activated or inactivated). The card issuer identifier may represent an institution issuing or managing the contactless card 110a.

In response to receiving data indicating that contactless card 110a is activated (605—Yes), the application 122: receives, from the contactless card 110a, a public key of a key pair at 606; instructs generation of a digital signature by the contactless card 110a using a private key of the key pair of the card at 608; receives the digital signature from the contactless card 110a at 610; and verifies the digital signature using the public key at 612. The features described with reference to 606-612 may be substantially similar to the relevant functions described above with reference to 508-514 of FIG. 5.

In response to verification of the digital signature, at 614, the application 122 grants the user access to first-level user account options. At 616, in response to a user request for a second-level user account options (e.g., an attempt to transfer account assets), the application 122 may prompt the user for a first user credential (e.g., biometrics data such as fingerprint data, optical data, and/or facial recognition, an established gesture associated with the user, and/or a username and password combination). The processor 124 compares at least a portion of the first user credential and a stored second user credential at 618. The stored user credential may be located on the computing device 120 and/or on the web server 140. At 620, in response to finding a match, the application 122 grants the user access to the second-level user account options.

In response to determining the contactless card 110a is inactivated (605-No), computing device 120 may activate the contactless card 110a. For example, at 622, the computing device 120 transmits, to account server 150, at least a portion of the card information and a request to activate the contactless card 110a. The account server 150 processes the request to activate the card by either approving or denying activation of the card. Responsive to transmitting the activation request, at 624, the computing device 120 receives a status indicator of the request to activate the contactless card 110a from the account server 150. The status indicator may include an activated status indicator or a denied status indicator. At 626, the application 122 may display a visual representation of the status indicator. In some embodiments and as shown at 628, after the computing device 120 receives an activated status indicator, the application 122 may instruct the contactless card 110a to update the activation field to reflect the card as being activated.

In some embodiments, the contactless card 110a may send a predetermined digital signature and public key to the computing device 120 as the card information. The computing device 120 may transmit, to the account server 150, and request verification of the predetermined digital signature. In some cases, computing device 120 may further transmit additional information (e.g., a network identifier, a device phone number or identification, other device information, etc.), which may be used as a validation check for activation, fraud prevention, higher security, and/or the like.

In some embodiments, a dedicated application 122 executing on computing device 120 may perform the activation of the contactless card 110a. In other embodiments, a webportal, a web-based app, an applet, and/or the like may perform the activation. Activation may be performed on the computing device 120, or the computing device may merely act as a go between for the contactless card 110a and an external device (e.g., account server 150). According to some embodiments, in providing activation, the application 122 may indicate, to the account server 150, the type of device performing the activation (e.g., personal computer, smartphone, POS, or tablet). Further, the application 122 may output, for transmission, different and/or additional data to the account server 150 depending on the type of device involved.

According to some embodiments, prior to performing card activation the application 122 requires the user to enter the first user credential for a user profile. The processor 124 verifies the first user credential against a stored second user credential associated with the user profile. The stored second user credential may be located on the computing device 120 and/or stored on a web server 140. In response to the user logging onto the application 122, the application 122 may display a plurality of user options (e.g., display of account balance, display of recent transactions, a card-activation option). Responsive to a user selection of the card-activation option from amongst the plurality of user options, the application 122 may output for display a request to communicate with the contactless card 110a.

In some embodiments, the example authentication communication protocol may mimic an offline dynamic data authentication protocol of the EMV standard that is commonly performed between a transaction card and a point-of-sale device, with some modifications. For example, in the disclosed embodiments, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

Turning back to FIG. 6, in some cases, after activating the card, the method may transition to 606 and/or 616. Moreover, as would be understood by one of ordinary skill, the blocks may be performed in various orders, additional functions may be incorporated therebetween, and not all described functions may be performed in every embodiment.

Figure 7:
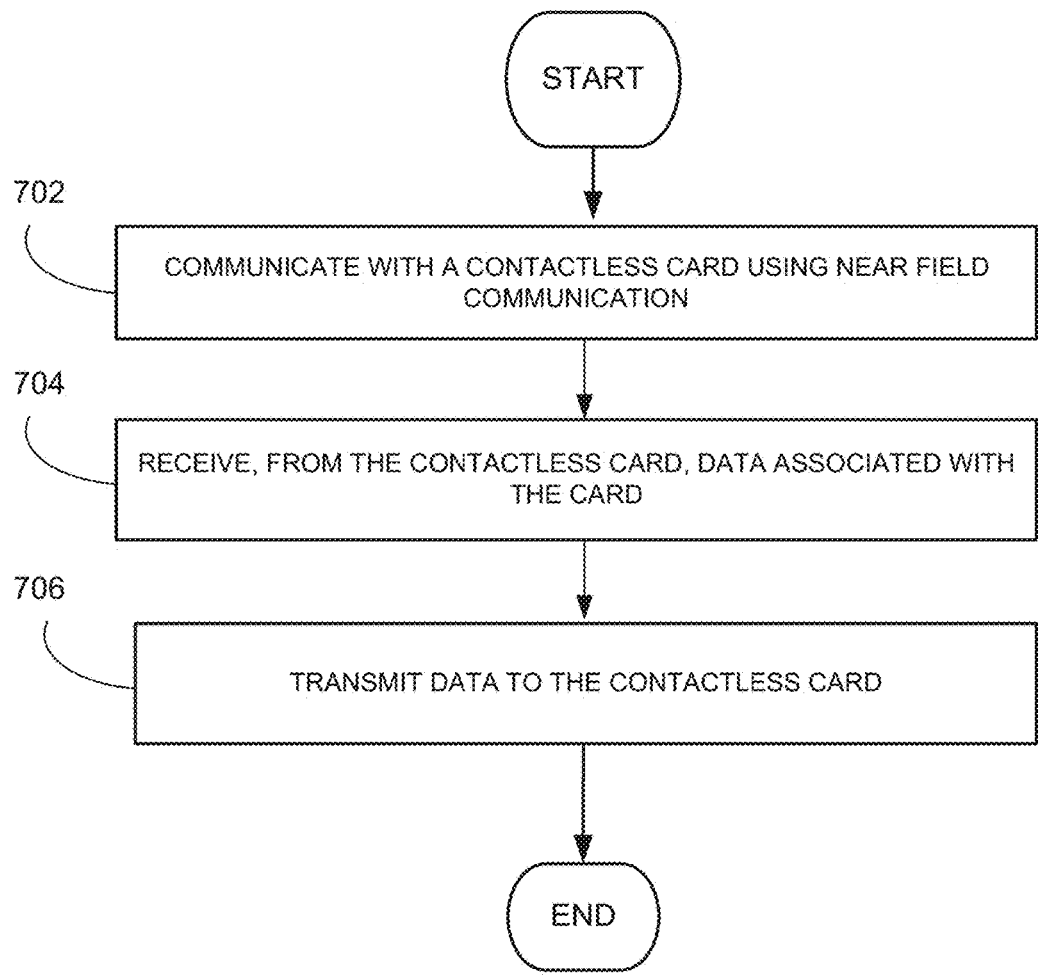
FIG. 7 is a flow chart of a method for pairing a card to a device according to an example embodiment.

FIG. 7 is a flow chart of a method for pairing a card to a device according to an example embodiment. According to some embodiments, an application 122 is enabled on a computing device 120. At 702, communication between the contactless card 110a and the application 122 begins when the contactless card is within an acceptable distance (e.g., less than twenty centimeters) of the card reader 126 associated with the application 122. For example, application 122 may establish a communication link with the contactless card 110a using an NFC standard. The computing device 120 receives, from the contactless card 110a, data associated with the card at 704. The data associated with the card may include an unextracted public key of a public/private card key pair of the card. The unextracted public key may be previously encrypted by an issuer of contactless card 110a using a private key of a public/private issuer key pair. The application 122 using the issuer public key may extract the card public key.

In some embodiments, based on the data received from the contactless card 110a, the computing device may verify the compatibility of the contactless card 110a with the application 122. For example, the computing device 120 may ensure only credit cards are paired with the application 122 as opposed to other devices using NFC (e.g., access cards, tracking scanners). In some embodiments, the data received from the contactless card 110a may be used to generate a virtual payment card as part of a digital wallet associated with the computing device 120.

At 706, the computing device 120 transmits data to the contactless card 110a. The data may include instructions to generate a digital signature using the private key of the key pair. Responsive to generation of the digital signature, the computing device 120 may receive the digital signature from the contactless card 110a. The contactless card 110a may be verified based on the digital signature and the public key of the public/private card key pair computing device 120. As detailed above, the use of this READ and WRITE NFC capability to perform offline dynamic data authentication between a contactless card and a user's computing device provide unique advantages that enable application 122 to more reliably (e.g., with greater security from counterfeiting or card skimming, or man in the middle attacks) authenticate the contactless card to be used as a form of multifactor authentication.

Figure 9:
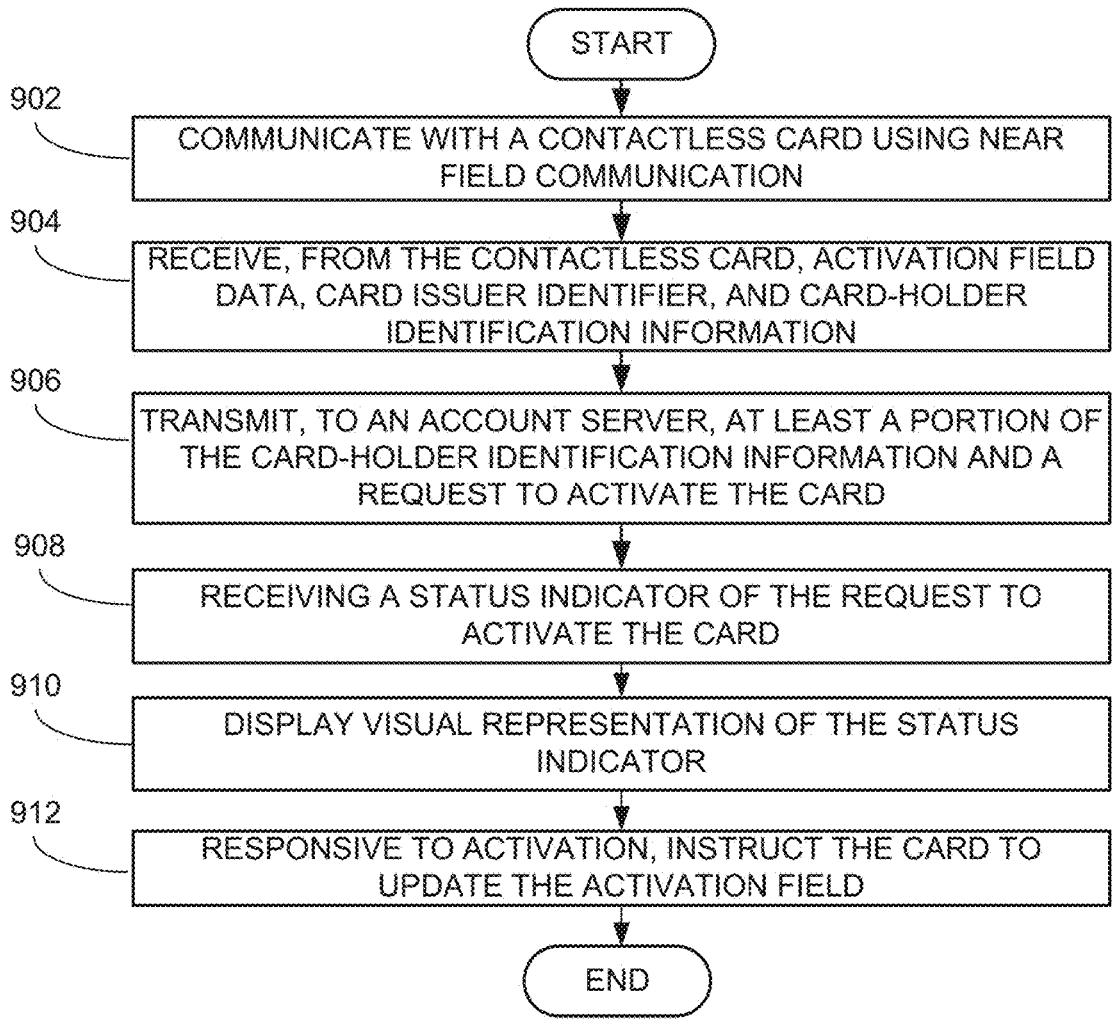
FIG. 9 is a flow chart of a method for activating a contactless card according to an example embodiment.

FIG. 9 is a flow chart of a method for activating a contactless card according to an example embodiment. According to some embodiments, an application 122 is enabled on a computing device 120. The application 122 communicates with the contactless card 110a using, for example, NFC at 902. At 904, the computing device 120 receives data from the contactless card 110a, which may include activation field data, a card issuer identifier, cardholder identification information, and/or the like. At 906, the processor 124 transmits, to an account server 150, at least a portion of the card-holder identification information and a request to activate the contactless card 110a. In some embodiments, based on the card issuer identifier, the processor 124 may determine a particular account server of a plurality of account servers to transmit data to. The processor 124 may receive a status indicator of the request to activate the card at 908. The status indicator may be an activated status indicator or a denied status indicator. At 910, the application 122 displays a visual representation of the status indicator. In some embodiments and as shown at 912, the application 122 may instruct the contactless card 110a to update the activation field.

Figure 10:
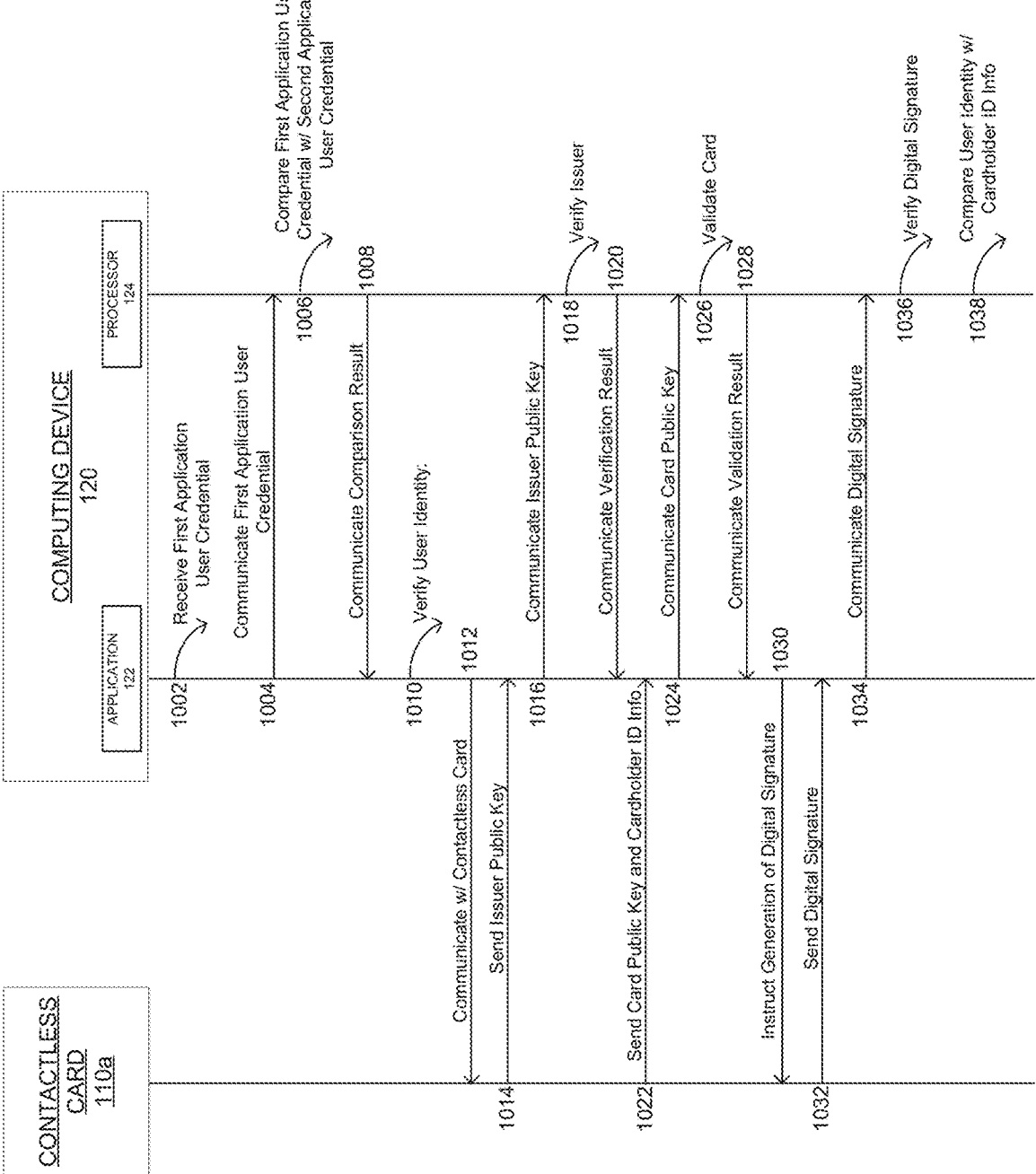
FIG. 10 is a timing diagram of authenticated cardholder access according to an example embodiment.

FIG. 10 is a timing diagram providing authenticated cardholder access according to an example embodiment. Referring to FIG. 10, the method includes: receiving, by the application 122, a first application user credential at 1002 from a user; communicating, by the application 122 and to the processor 124, the first application user credential at 1004; comparing (e.g., for a match), the first application user credential with a stored second application user credential at 1006; communicating the comparison result from the processor 124 to the application 122, at 1008; initiating, by the application 122, verification of the user identity at 1010; and communicating with the contactless card 110a at 1012. These features may be substantially similar to the corresponding features described above with reference to FIG. 2.

At 1014, in response to and the communication, the application 122 receives, from the contactless card 110a, an issuer public key of a key pair. The application 122 communicates the issuer public key to the processor 124 at 1016. Using the issuer public key, the processor 124 verifies the card issuer at 1018, (e.g., by decrypting certain static data certified by the card issuer using the issuer public key). In response to verifying the card issuer, at 1020, the processor 124 communicates the verification result to the application 122.

At 1022, the contactless card 110a sends the card public key of a card public/private key pair and cardholder identification information to the application 122. In some embodiments, the cardholder identification information and the card public key may be transmitted separately. At 1024, the application 122 communicates the card public key to the processor 124. At 1026, using the card public key, the processor 124 validates the card. The processor 124 communicates the validation result to the application 122, at 1028.

At 1030, the application 122 instructs the contactless card 110a to generate a digital signature using the card private key of the card public/private key pair. In response to generating the digital signature, the contactless card 110a sends the digital signature to the application 122, at 1032. At 1034, the application 122 communicates the digital signature to the processor 124. At 1036, the processor 124 verifies the digital signature. The processor 124 may use the card public key to verify the signature. Again, here, as detailed above, the implementation of the above READ and WRITE NFC capability to perform offline dynamic data authentication between a contactless card and a user's computing device (and/or application executing on the device) provide unique advantages that enable application 122 to more reliably (e.g., with greater security from counterfeiting or card skimming, or man in the middle attacks) authenticate the contactless card to be used as a form of multifactor authentication. At 1038, the processor 124 compares, for a second match, at least a portion of the user identity with at least a portion of the cardholder identification information. Subject to the second match, the user may be able to access second-level user account options.

Figure 8:
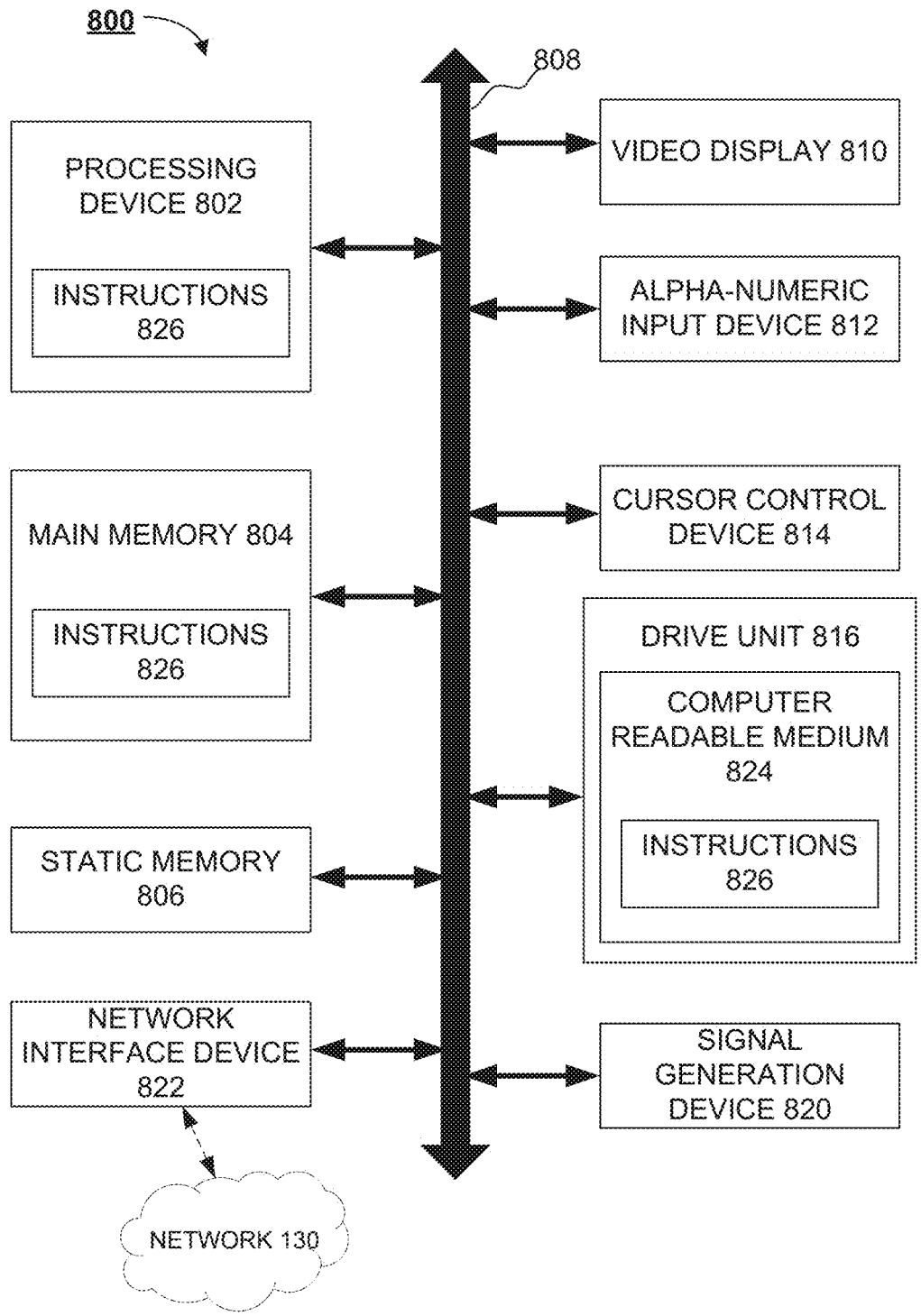
FIG. 8 is a block diagram of an example computer system that may implement certain aspects of the present disclosure.

FIG. 8 is a block diagram of an example computer system 800 that may implement certain aspects of the present disclosure. The computer system 800 may include a set of instructions 826 for controlling operation of the computer system 800. In some implementations, the computer system 800 may be connected (e.g., networked) to other machines in a Local Area Network (LAN), an intranet, an extranet, a satellite communications system, or the Internet. The computer system 800 may operate in the capacity of a server or a client machine in a client-server network environment, or as a peer machine in a peer-to-peer (or distributed) network environment. The computer system 800 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 800 is illustrated, the term "machine" shall also be taken to include any collection of machines (e.g., computers) that individually or jointly execute a set (or multiple sets) of instructions to perform any one or more of the methodologies discussed herein.

The computer system 800 includes a processing device 802, a main memory 804 (e.g., read-only memory (ROM), flash memory, dynamic random-access memory (DRAM) such as synchronous DRAM (SDRAM), etc.), a static memory 806 (e.g., flash memory, static random-access memory (SRAM), etc.), and a secondary memory 816 (e.g., a data storage device), which communicate with each other via a bus 808.

The processing device 802 represents one or more general-purpose processing devices such as a microprocessor, a microcontroller, a central processing unit, or the like. As non-limiting examples, the processing device 802 may be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the operations for electronically creating and trading derivative products based on one or more indices relating to volatility.

The computer system 800 may further include a network interface device 822, which is connectable to a network 130. The computer system 800 also may include a video display unit 810, i.e., a display (e.g., a liquid crystal display (LCD), a touch screen, or a cathode ray tube (CRT)), an alphanumeric input device 812 (e.g., a keyboard), a cursor control device 814 (e.g., a mouse), and a signal generation device 820 (e.g., a speaker).

The secondary memory 816 may include a non-transitory storage medium 824 on which is stored one or more sets of instructions 826 for the computer system 800 representing any one or more of the methodologies or functions described herein. For example, the instructions 826 may include instructions for implementing an asset tracking device including a power source and power management system or subsystem for a container or a trailer. The instructions 826 for the computer system 800 may also reside, completely or at least partially, within the main memory 804 and/or within the processing device 802 during execution thereof by the computer system 800, the main memory 804 and the processing device 802 also constituting computer-readable storage media.

While the storage medium 824 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use cases describe examples of particular implementations of the present disclosure. These are intended solely for explanatory purposes and not for purposes of limitation. In one case, a first friend (payor) owes a second friend (payee) a sum of money. Rather than going to an ATM or requiring exchange through a peer-to-peer application, payor wishes to pay via payee's smartphone (e.g., computing device 120). Payee logs-on to the appropriate application on his smartphone and selects a payment request option. In response, the application requests authentication via payee's credit card. For example, the application outputs a display requesting that payee tap his RFID credit card. Once payee taps his RFID credit card against the screen of his smartphone with the application enabled, the card is read and verified. Next, the application displays a prompt for payor to tap his RFID card to send payment. After the payor taps his RFID card, the application reads the card information and transmits, via an associated processor, a request for payment to payor's card issuer. The card issuer processes the transaction and sends a status indicator of the transaction to the smartphone. The application then outputs for display the status indicator of the transaction.

In another example case, a credit card customer receives a new credit card in the mail. Rather than activating the card by calling a provided telephone number associated with the card issuer or visiting logging into a website, the customer decides to activate the card via an application (e.g., application 122) on his smartphone (e.g., computing device 120). The customer selects the card activation feature from the application's menu. The application prompts the customer to tap his RFID credit card against the screen. Upon tapping the RFID credit card against the screen of the smartphone, the application communicates with a card issuer server and activates the customer's card. The application then displays a message indicating successful activation. The card activation is now complete.

In another example case, a customer wants to access his financial accounts on his mobile phone. The customer launches an application (e.g, a bank application) on the mobile device and inputs a username and password. At this stage, the customer may see first-level account information (e.g., recent purchases) and be able to perform first-level account options (e.g., pay credit-card). However, if the user attempts to access second-level account information (e.g., spending limit) or perform a second-level account option (e.g., transfer to external system) he must have a second-factor authentication. Accordingly, the application requests that a user provide a transaction card (e.g., credit card) for account verification. The user then taps his credit card to the mobile device, and the application verifies that the credit card corresponds to the user's account. Thereafter, the user may view second-level account data and/or perform second-level account functions.

What is claimed is:

1. A method comprising:
receiving, via an account, a card activation request from a user initially authenticated for and associated with the account;
determining that the user requires additional authentication to complete the card activation request;
responsive to determining that the user requires additional authentication to complete the card activation request, transmitting, to a transaction card not yet activated for use in commercial transactions, a request for authentication data;
receiving the authentication data from the non-activated transaction card;
verifying that the transaction card is associated with the account based on the authentication data received from the non-activated transaction card; and
transmitting cardholder data and the card activation request to an account provider server.

2. The method of claim 1, wherein:
an application is associated with a mobile device and the account associated with the user,
verifying that the transaction card is associated with the user account further comprises:
transmitting, by the application, the authentication data to the account provider server; and
receiving, by the application, an indication that the account was verified based on the authentication data from the account provider server.

3. The method of claim 2, wherein the authentication data is a digital signature, and further comprising:
responsive to matching a received first user credential with a stored user credential, providing access to the account.

4. The method of claim 3, further comprising:
receiving, by the application, a status of the card activation request, the status including activated or denied.

5. The method of claim 3, wherein the first user credential comprises at least one of biometrics data, an established gesture associated with user recognition, or a username and password combination.

6. The method of claim 4, further comprising:
causing, by the application, a computing device to display the status of the card activation request, and wherein:
the first user credential is associated with a user of an account having an associated transaction card provided by an account provider.

7. The method of claim 6, wherein:
an activated status of the transaction card corresponds to the transaction card being enabled for commercial transactions, and further comprising:
converting the non-activated transaction card to an activated transaction card.

8. The method of claim 7, wherein:
the transaction card being enabled for commercial transactions allows the transaction card to operate for commercial transactions using EMV standards, and
the transaction card is a contactless transaction card.

9. The method of claim 3, further comprising:
responsive to providing access to a user account based on the matching of a first user credential to a stored user credential, providing, through the application, access to one or more first-level user account options of the user account; and
responsive to verifying the additional authentication, providing, through the application, access to one or more second-level user account options of the user account.

10. The method of claim 9, wherein
the user account is a financial account,
the one or more first-level user account options comprises at least one of a display of an account balance or display of recent transactions, and
the one or more second-level user account options comprises at least one of a payment transfer, a payment request, a personal identification number (PIN) change request, a card activation request, or an address change request.

11. A method comprising:
receiving, using one mobile application operating on a mobile device, a request to access a user account option from a user initially authenticated for and associated with an account;
determining that the user account option requires step-up authentication;
responsive to the user account option requiring step-up authentication, transmitting, from the mobile device to a transaction card, a request for authentication data;
receiving the authentication data from the transaction card;
verifying that the transaction card is associated with the account based on the authentication data received from the transaction card; and
providing access to the user account option requiring step-up authentication in the mobile application.

12. The method of claim 11, wherein:
the user account option requiring step-up authentication is a card activation request for the transaction card to be enabled for commercial transactions, and
the method further comprises:
sending, with the application, a card activation request to an account provider server;
receiving, at the application, a status of the card activation request, the status including activated or denied, wherein an activated status of the transaction card corresponds to the transaction card being enabled for commercial transactions; and
causing, by the application, a user device to display the status of the card activation request.

13. The method of claim 11, wherein transmitting, to a transaction card, a request for authentication data further comprises:
receiving, by the application, a public key of a key pair from a card;
sending, by the application, instructions to generate a digital signature by using a private key of the key pair to the card; and wherein
receiving the public key further comprises:
communicating, using an antenna associated with a user device operating the application, with the card using near field communication (NFC).

14. The method of claim 13, wherein the card is configured to communicate with one or more point-of-sale devices to conduct a transaction in accordance with EMV standards.

15. The method of claim 14, further comprising:
prompting, by the application, the user to position the card within a first range of the user device, the first range being configured to facilitate near field communication (NFC) between the card and the user device;
detecting, by the user device, that the card is positioned within the first range of the user device; and
responsive to detecting that the card is positioned within the first range of the user device, sending, by the application, a request for the public key to the card.

16. The method of claim 15, wherein the user account option requiring step-up authentication comprises at least one of a payment transfer, a payment request, or an address change request.

17. A computing device comprising:
one or more processors; and
a memory in communication with the one or more processors and storing instructions that, when executed by the one or more processors, are configured to cause the computing device to:
receive a request from a user initially authenticated for and associated with an account to access a first user account option requiring step-up authentication via a mobile application operating on the computing device;
transmit, to a transaction card, a request for authentication data;
receive the authentication data from the transaction card;
transmit the authentication data to one or more servers associated with an account provider;
receive, from the one or more servers associated with the one or more servers associated with the account provider server, a verification of the authentication data; and
provide access to the first user account option via the mobile application.

18. The computing device of claim 17, wherein the instructions, when executed by the one or more processors are configured to cause the computing device to:
communicate, using an antenna associated with the computing device, with the transaction card using near field communication (NFC);
receive, by the application, a public key of a key pair from a transaction card; and
instruct, by the application, the transaction card to generate a response comprising a digital signature using a private key of the key pair.

19. The computing device of claim 18, wherein:
the authentication data comprises the digital signature, and
an issuer of the transaction card previously encrypted the public key.

20. The computing device of Claim 18, wherein:
the first user account option is a card activation request, and
the instructions, when executed by the one or more processors are configured to cause the computing device to:
send, by the application, the card activation request to the one or more servers associated with the account provider;
receive, at the application, a status of the card activation request, the status including activated or denied, wherein an activated status of the transaction card corresponds to the transaction card being enabled for commercial transactions; and
cause, by the application, the computing device to display the status of the card activation request.

21. The computing device of claim 18, wherein:
the first user account option is a payment request, and
the instructions, when executed by the one or more processors are configured to cause the computing device to:
send, by the application, the payment request to the one or more servers associated with the account provider;
receive, at the application, a status of the payment request, the status including accepted or rejected; and
cause, by the application, the computing device to display the status of the payment request.

22. The computing device of claim 18, wherein:
the first user account option is a payment transfer, and
the instructions, when executed by the one or more processors are configured to cause the computing device to:

send, by the application, the payment transfer to the one or more servers associated with the account provider;
receive, at the application, a status of the payment transfer, the status including accepted or rejected; and
cause, by the application, the computing device to display the status of the payment transfer.

\* \* \* \* \*